United States Patent
Feinbloom et al.

(10) Patent No.: US 6,488,373 B1
(45) Date of Patent: Dec. 3, 2002

(54) CLIP-ON PIVOTING TELESCOPE LENS ASSEMBLY HAVING MEANS FOR PRECISE PLACEMENT OF THE TELESCOPE LENS IN THE OPERATIVE POSITION

(75) Inventors: Richard E. Feinbloom, New York, NY (US); Amy Grumet-Avallone, Smithtown, NY (US)

(73) Assignee: Designs for Vision, Inc., Ronkonkoma, NY (US)

(*) Notice: Subject to any disclaimer, the term of this patent is extended or adjusted under 35 U.S.C. 154(b) by 0 days.

(21) Appl. No.: 09/929,993

(22) Filed: Aug. 14, 2001

(51) Int. Cl.[7] .................................................. G02C 9/00
(52) U.S. Cl. ............................ 351/57; 351/58; 351/158
(58) Field of Search ............................... 381/47, 57, 48, 381/58, 158, 41; 359/409, 411; 362/105, 32, 804

(56) References Cited

U.S. PATENT DOCUMENTS

| | | |
|---|---|---|
| 3,575,497 A | 4/1971 | Leblanc |
| D296,337 S | 6/1988 | Caplan |
| 4,929,075 A | 5/1990 | Eliakim |
| 5,164,749 A | 11/1992 | Shelton |
| 5,258,786 A | 11/1993 | Penrod |
| 5,541,767 A | 7/1996 | Murphy et al. |
| 5,652,636 A | 7/1997 | Feinbloom |
| 5,694,193 A | 12/1997 | Murphy et al. |
| 5,822,048 A | 10/1998 | Feinbloom |
| D405,901 S | 2/1999 | Feinbloom et al. |
| 6,007,035 A | 12/1999 | Feinbloom et al. |
| 6,064,520 A * | 5/2000 | Nowak et al. ................. 351/57 |
| 6,254,232 B1 | 7/2001 | Friedman |

* cited by examiner

*Primary Examiner*—Hung Xuan Dang
(74) *Attorney, Agent, or Firm*—Duane Morris LLP (57) ABSTRACT

A telescope lens assembly removably mountable on a spectacle frame is provided which includes a mounting bracket having a first pair of fixed clamping arms, a telescope lens pivotally mounted on the mounting bracket with a support bracket, a spring clip having a handle, a second pair of clamping arms for engaging with the first pair of clamping arms, and two projections, and a wire spring wound around each of the two projections which engages with the support bracket to allow precise placement of the telescope lenses in an operative position from a non-operative position.

14 Claims, 6 Drawing Sheets

CLIP-ON PIVOTING TELESCOPE LENS ASSEMBLY HAVING MEANS FOR PRECISE PLACEMENT OF THE TELESCOPE LENS IN THE OPERATIVE POSITION

FIELD OF THE INVENTION

The present invention relates generally to visual aids and more particularly to an optical device including a pivotally and removably attached lens assembly which can be repeatedly and precisely placed in a selected operative position without the need for refocusing.

BACKGROUND OF THE INVENTION

Many people are employed in occupations that involve precision work performed at an arms-length distance, for example, surgeons, dentists, medical and other technicians, and machinists. Precision work is much more desirably performed if the work area can be significantly magnified as this reduces eye fatigue, improves working posture and increases the accuracy of the job. Moreover, there are people with serious vision deficiencies who must use vision aids in order to view objects that are either close-up or remotely located.

Accordingly, a number of devices have been developed which provide magnification of distantly located objects. Many of these devices combine a set of spectacles with a pair of telescopes. In some of these devices, each telescope is attached directly to its respective lens of the spectacles. One such device can be seen by referring to U.S. Pat. No. 4,929,075 entitled OPTICAL VIEWING SYSTEM issued to Eliakim on May 29, 1990.

Other devices have telescopic lens assemblies that are pivotally attached to the spectacle frame. An example of such a device is disclosed in U.S. Design Pat. No. 296,337 entitled DENTAL BINOCULARS issued to Caplan on Jun. 21, 1988. In this patent, a pair of telescopes are supported in a frame that is pivotally connected to a spectacle frame by a hinge arrangement. When the user wishes to view an object through the telescopes, the user flips the telescopes down in front of the lenses. When the user wishes to view conventionally through the spectacles, the telescopes are flipped up and away from the lenses.

A variety of devices for securing objects to eyeglasses or spectacles are also known. For example, there are many well-known clip-on devices for securing sun visors and ornamental fixtures to a pair of eyeglasses.

A problem associated with devices employing pivoting telescopic lens assemblies is that each time the telescopes are flipped-down into the operative position, the user must refocus each of the telescopes. This is because these devices do not provide a mechanism for accurately placing the telescopic lens assembly in the same position each time the lenses are flipped down. This can be quite an inconvenience especially if the user happens to be a surgeon, dentist, or a laboratory technician. In this situation, the user must interrupt the procedure or test being performed and refocus the telescopes or attempt to pivot the telescopes back into the same position as before. This is especially inconvenient, particularly during procedures where the surgeon or dentist is repeatedly flipping the telescope assembly up and down to look between the work area or patient, equipment, and/or personnel.

Another problem associated with pivoting telescope assemblies relates to the difficulty encountered when attempting to look around the telescope assembly in the flipped-down operative position. More particularly, the support frames used to mount the telescopes tend to obstruct a portion of the spectacle lenses. Additionally, these support frames centrally position the telescopes in front of the spectacle lenses when the telescopic lens assembly is in the flipped-down, operative position. Thus, if the user wishes to look through the spectacles in a conventional manner, the user must flip up the spectacles to the non-operative position.

One solution to the problem is found in U.S. Pat. No. 5,694,193 to Murphy, assigned to the assignee herein, which relates to a locking pivoting lens assembly with a hinge detent. The optical device comprises a spectacle frame with a pair of optical lenses. The optical device further includes a lens assembly pivotally attached to the spectacle frame which is pivotable between an operative position, and a non-operative position. A detent mechanism included in the optical device allows a user to repeatedly position the lens assembly into either position. The device, however, is attached to the spectacle frame, and hence, is not easily removable.

Thus, there remains a need for an improved optical spectacle device that employs a pivoting telescopic lens assembly that can be repeatedly flipped down into precisely the same operative position from a non-operative position, thereby eliminating the need to repeatedly refocus each of the telescopes, and which also is easily removable from the spectacle frame.

SUMMARY OF THE INVENTION

Briefly described, the telescope lens assembly of the present invention is removably mountable on a spectacle frame and includes a mounting bracket comprising a base and a first pair of fixed clamping arms; a telescope lens pivotally mounted on the base via a support bracket; a spring clip, comprising a handle, a second pair of clamping arms for engaging with said first pair of clamping arms, and two projections; a wire spring wound around each of said two projections which engages with the support bracket to allow precise placement of said telescope lens in an operative position. The support bracket has a flat portion on which the spring rests when the telescope lens is in an operative position, and has a detent in which the spring rests when the telescope lens is in a non-operative position.

The telescope lens assembly removably mountable on a spectacle frame includes an elongate bar member comprising a substantially planar surface with raised portions each portion defining an interior; a first pair of fixed clamping arms disposed substantially perpendicular to said bar member; a first platform comprising a substantially planar surface extending in a first direction from said bar member, and a stop which defines a recess, the stop disposed substantially perpendicular to the first platform; two second platforms extending in a second direction from said bar member, each of the two second platforms comprising a brace disposed substantially perpendicular to said bar member; a telescope lens assembly comprising a support bracket pivotally mounted on the first platform adjacent the recess; a clip member pivotally mounted by a double spirally wound spring adjacent the brace of each of the two second platforms and the interior of the raised portions, the clip member comprising a first post and second post for receiving the respective spirally wound portions of the spring, and a second pair of fixed clamping arms for cooperatively engaging with the first pair of fixed clamping arms, the spring member engaging the bar member to allow precise placement of the telescope lens in an operative position. The clip member also includes a handle. Preferably, the elongate bar member, the first pair of clamping arms, first platform, and two second platforms are of unitary construction.

The mounting bracket of the present invention includes a planar base with raised portions extending in one direction having semi-circular cutaway interiors; a first pair of fixed clamping arms extending substantially perpendicular to and extending in an opposite direction from the raised portions; a first platform comprising a planar surface extending in a first direction from the base along the same plane thereof, and a stop which defines a recess, said stop disposed substantially perpendicular to the first platform; and two braces extending in a second direction from the base which are disposed substantially perpendicular to the base. A telescope lens assembly comprising a telescope lens and support bracket is pivotally mounted on said the platform adjacent said recess by a support bracket comprising a flat portion and a detent. A clip member comprising a handle, a first post and a second post, and a second pair of fixed clamping arms cooperatively engages with the first pair of fixed clamping arms, wherein a spring member is spirally wound onto the first and second posts for pivotally mounting the clip member to the mounting bracket, and for retaining the support bracket of the telescope lens assembly adjacent the cutaway interiors of the raised portions.

DETAILED DESCRIPTION

The present invention will now be described in further detail with reference to the accompanying drawings, in which a preferred embodiment of the invention is shown. Those skilled in the art will appreciate that the invention may be embodied in many different forms and should not be construed as limited to the embodiment set forth herein. This embodiment is provided so that this disclosure will be thorough and complete, and will fully convey the scope of the invention to those skilled in the art. In the drawings, like numbers refer to like elements throughout.

Figure 1A:
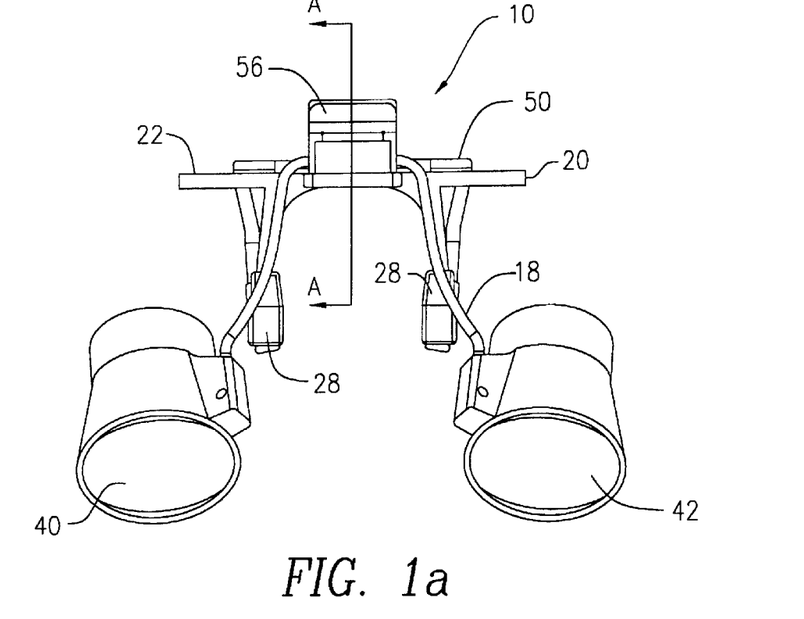
FIG. 1A is a front perspective view of a preferred embodiment of the optical device of the present invention in the operative position.
Figure 1B:
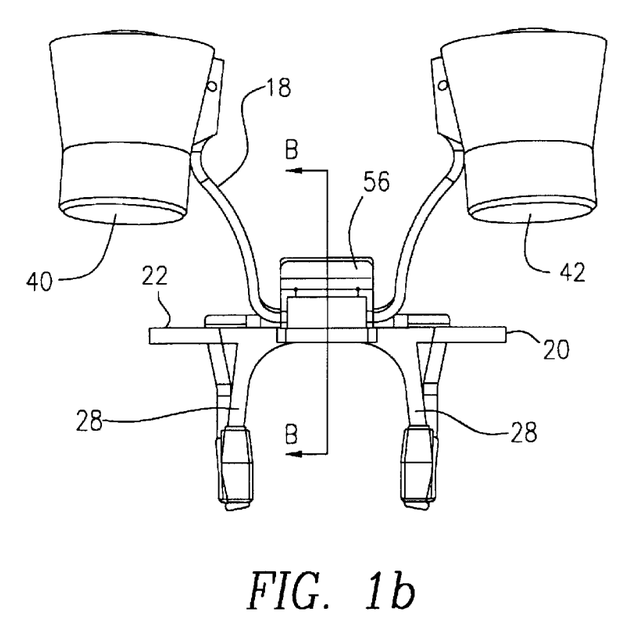
FIG. 1B is a front perspective view of the preferred embodiment of the optical device of the present invention in the non-operative position.

Referring to FIG. 1A, a preferred embodiment of the optical device and telescope lens assembly 10 is illustrated in the operative position. FIG. 1B illustrates the optical device 10 in the non-operative position. The optical device 10 is easily placed on a typical spectacle or eyeglass frame by a spring clip member 50 described in further detail below. The device 10 is illustrated on a typical eyeglass frame in FIGS. 7A and 7B.

Figure 3:
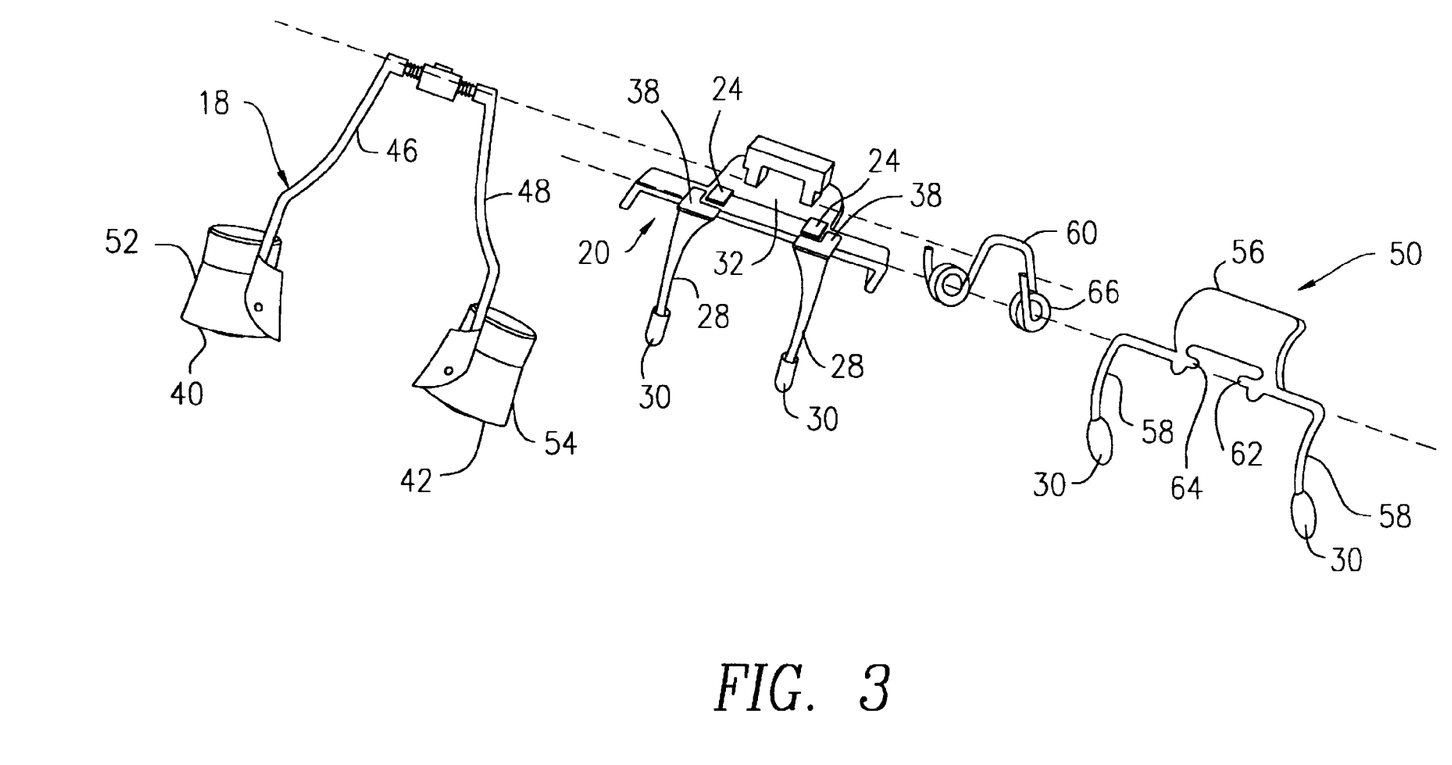
FIG. 3 is an exploded view of the optical device and lens assembly.
Figure 4:
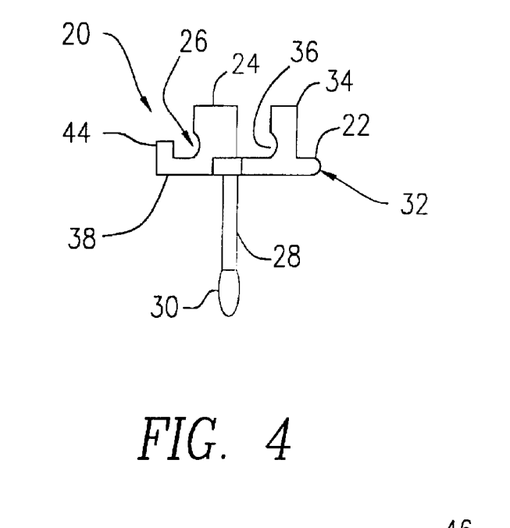
FIG. 4 is a side view illustrating the mounting bracket of the preferred embodiment of the present invention.

As illustrated in FIGS. 1A and 4, the optical device 10 includes a lens assembly with telescopic lenses 40 and 42 mounted on mounting bracket 20 by a pivoting telescope support bracket 18. The mounting bracket 20 is an elongate bar member having a substantially planar surface. The bracket 20 includes a base 22 with raised portions 24 that each define an interior 26 as seen in FIGS. 3 and 4. The interior 26 defined by the raised portions 24 is a cutaway interior that is semi-circular in shape.

Referring to FIGS. 1A and 1B, the mounting bracket 20 also has a first pair of clamping arms 28 disposed substantially perpendicular to the base 22 of the mounting bracket 20, in a downwardly direction opposite to the raised portions 24 on the planar surface of the base 22. The clamping arms 28 are disposed substantially perpendicular to the plane of the mounting bracket 20. The distal ends of the clamping arms 28 can include protective tips 30 formed of rubber, plastic, or other suitable material to prevent scratching of the lenses 14 and 16 of the spectacle frame, and to provide a gripping surface for securely attaching to the spectacle lenses 14 and 16 of a frame 12. Preferably, the mounting bracket is formed of plastic, but can be formed from any suitable material.

Referring now to FIG. 4, extending from the mounting bracket 20 in a first direction is a first platform 32 having a substantially planar surface. The platform 32 also includes a stop 34. The stop 34 is substantially an inverted L-shaped member which defines a recess 36 semi-circular in shape, and is disposed substantially perpendicular to the platform 32. The stop 34 in conjunction with a wire spring 60 retains the telescope support bracket 18 on the mounting bracket 20 as will be described in further detail below. Although only one side of the mounting bracket 20 is shown, the opposite side has the same configuration.

Referring now to FIGS. 3 and 4, extending from the mounting bracket 20 in a second direction are two second platforms 38 which each include a brace 44 disposed substantially perpendicular to the mounting bracket 20. Each brace 44 in conjunction with the wire spring 60 retains the spring clip 50 on the mounting bracket 20. Preferably, the mounting bracket 20 is of unitary construction that includes the aforementioned elements.

Telescope lenses 40 and 42 are pivotally attached to the mounting bracket 20 by telescope support bracket 18. Support bracket 18 has a substantially U-shaped configuration. The support bracket 18 includes a first arm 46 and a second arm 48. At the distal end of first arm 46 is a first housing 52 and at the end of second arm 48 is a second housing 54. The support bracket may be made of plastic or metal, but is preferably composed of metal.

Each of the housings 52 and 54 defines an aperture for receiving first and second telescope lenses 40 and 42. The first and second telescope lens 40 and 42 are adhesively disposed and secured within the aperture of the housings 52 and 54 using any suitable adhesive, although any suitable method for securing the lenses within the respective housings 52 and 54 may be employed. Preferably, the lenses 40 and 42 do not require focusing, and include Galilean telescopic lenses. Magnification provided by the telescope lenses may be 2.5 times, or any suitable magnification as desired.

Figure 2A:
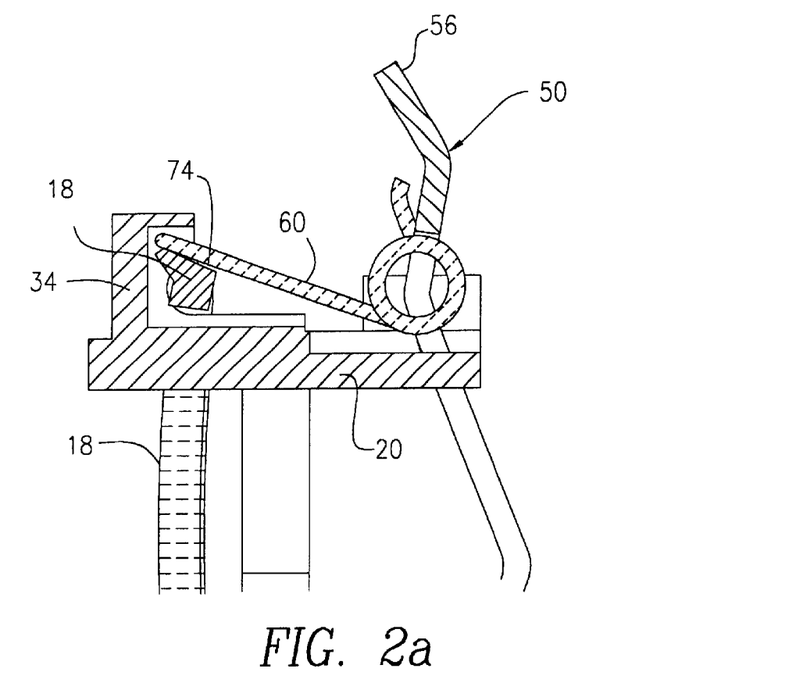
FIG. 2A is a partial cross-sectional side view of the preferred embodiment along lines A—A of FIG. 1A.
Figure 2B:
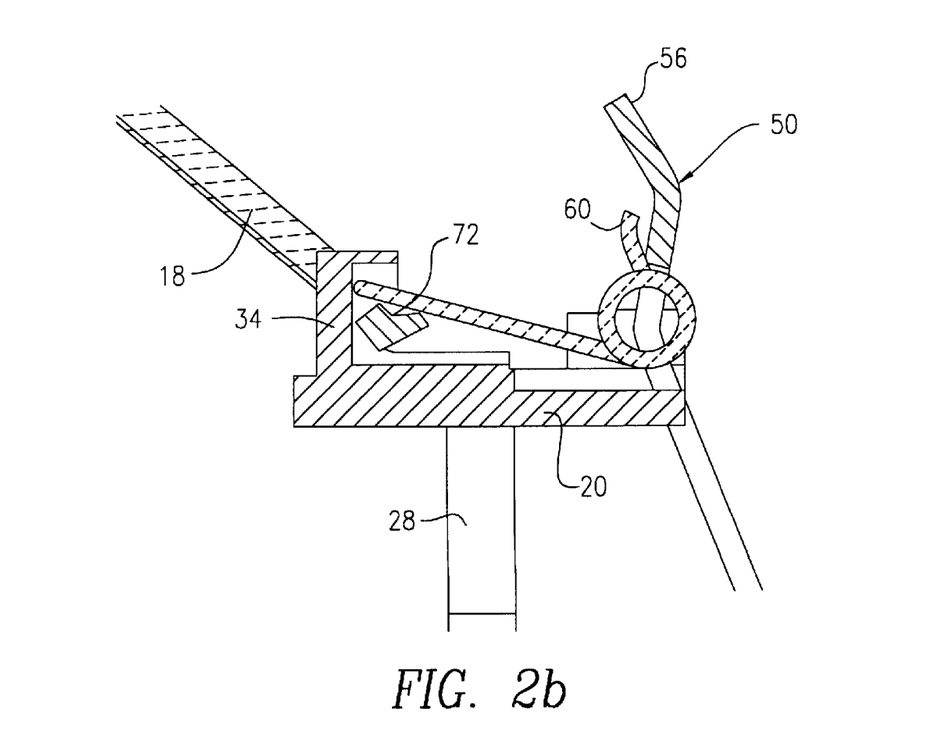
FIG. 2B is a partial cross-sectional side view of the preferred embodiment along lines B—B of FIG. 1B.
Figure 5:
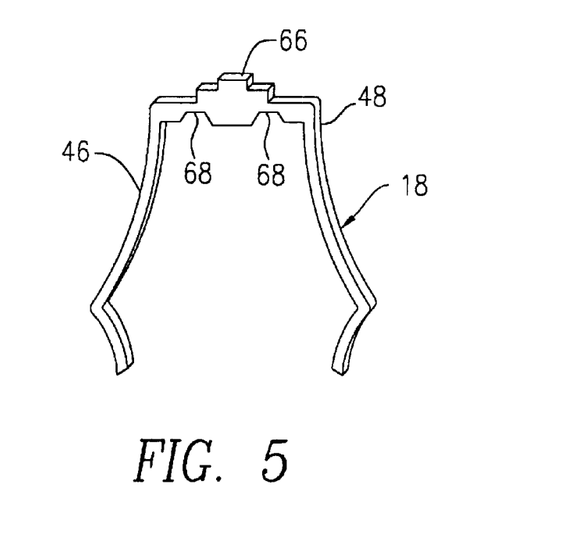
FIG. 5 is a front plan view of the telescope support bracket.
Figure 7A:
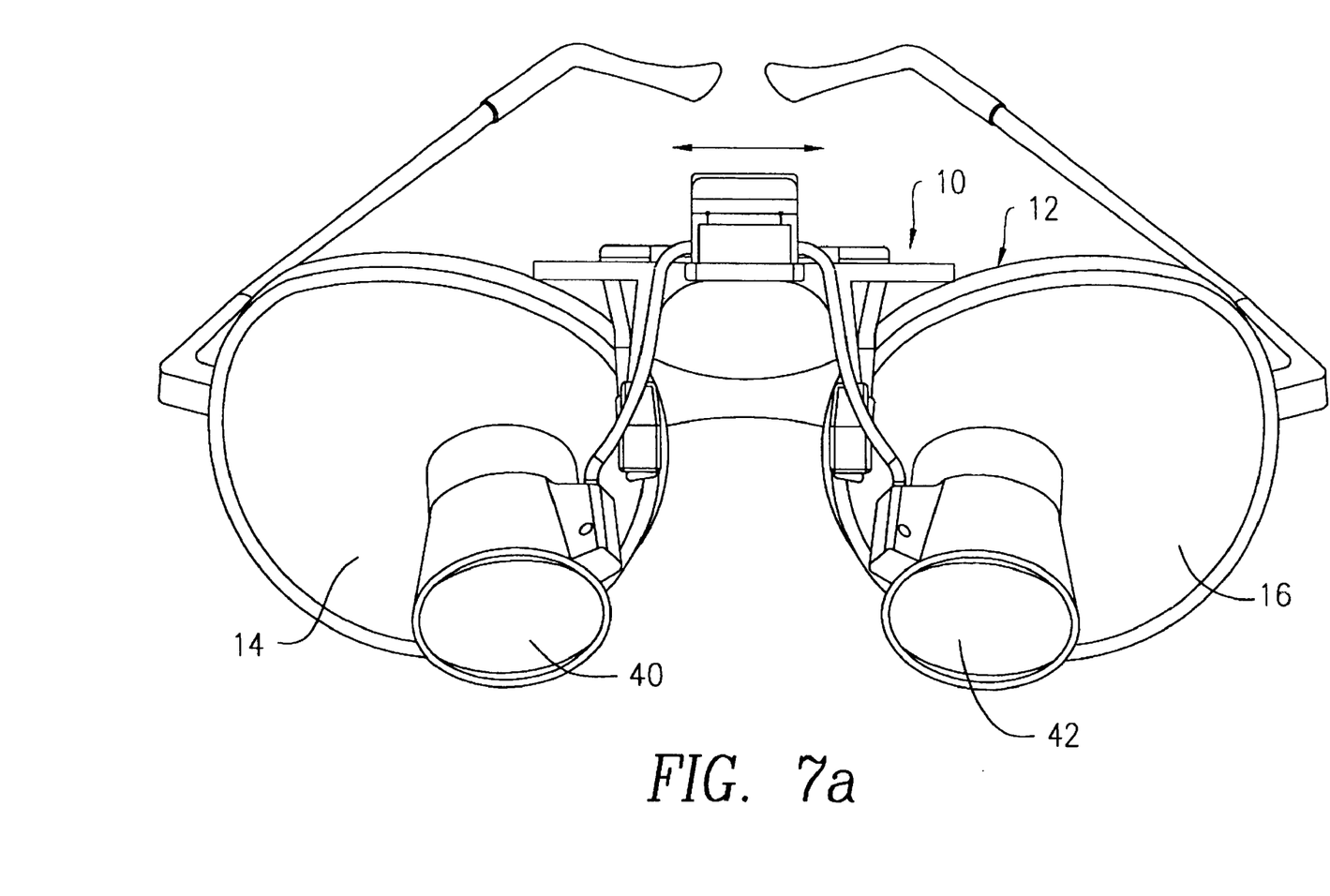
FIG. 7a is a front perspective view of the optical device and lens assembly of the present invention in the operative position disposed on an eyeglass frame.
Figure 7B:
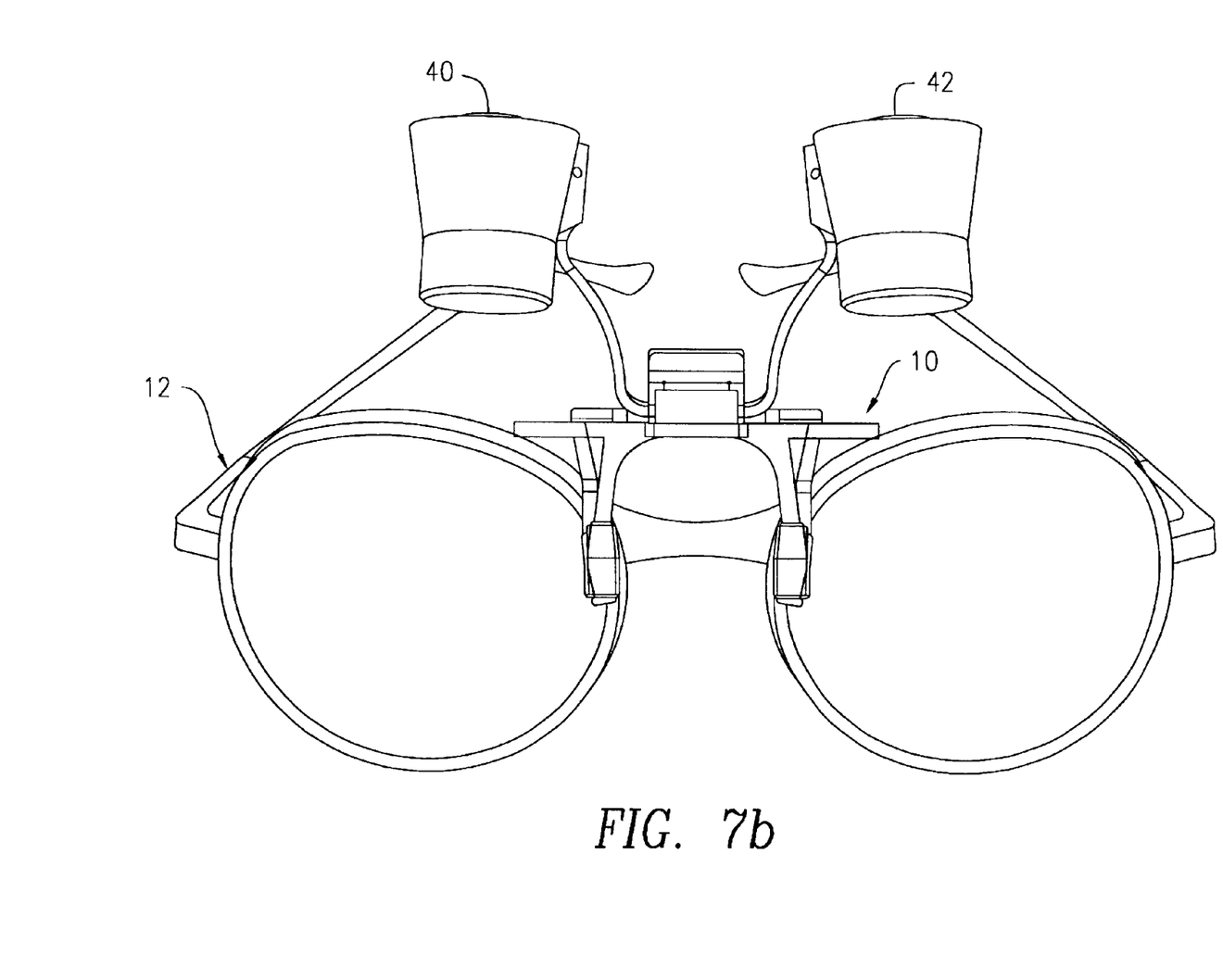
FIG. 7b is a front perspective view of the optical device and lens assembly of the present invention in the non-operative position disposed on an eyeglass frame.

As illustrated in FIGS. 2A, 2B, and 5, the telescope support bracket 18 has a raised portion 66 which engages with the spring clip member 50 to pivot and to maintain the lenses 40 and 42 in an operative (FIG. 2A) and non-operative (FIG. 2B) position until the user employs the spring clip 50 to change positions. Telescope support bracket 18 also includes two narrow portions 68 which allow the user to adjust the lens placement on a spectacle frame in the direction of the arrow as illustrated in FIG. 7A.

As illustrated in FIG. 2A, when the telescope lenses are in the operative position, there is a flat area 74 on the support bracket 18 upon which the spring 60 rests. As illustrated in FIG. 2B, when the telescope lenses are in the non-operative position, the spring 60 rests against a detent 72 has a V-shape surface on the support bracket 18.

Spring clip member 50 includes a second pair of fixed clamping arms 58. The clamping arms 58 are contoured for ease in placing the assembly 10 on a spectacle frame 12, and for allowing the telescope lenses 40 and 42 to be easily positioned on a frame 12 at an appropriate angle thereto. The distal ends of the clamping arms 58 can include protective tips 30 formed of rubber, plastic, or other suitable material as with the first pair of clamping arms 28. Spring clip 50 also includes a handle 56 and two projections 62 and 64 disposed at the proximal ends of the clamping arms 58 and the bottom of the handle 56.

A wire spring 60 is spirally wound around the two projections 62 and 64 for mounting the spring clip 50 onto the mounting bracket 20 adjacent each interior 26. As illustrated in FIG. 3, the wire spring 60 has a generally U-shaped configuration. The end portions of the spring 66 are coiled or spirally wound, and terminate in straight end portions. The coiled portions of the spring 60 are wound around the projections 62 and 64 of the handle 56, and when the handle 56 is actuated, the clamping arms 58 pivot with the handle 56 relative to the mounting bracket 20. When pivoted in this manner, the second pair of clamping arms 58 separate from the first pair of clamping arms 28 and open for ease in placing the assembly 10 on a spectacle frame 12 or removing the device 10 therefrom.

The spectacle frame 12 is conventionally made from plastic or metal, for example, and generally includes a pair of glass or plastic optical lenses 14 and 16. The optical lenses 14 and 16 can include corrective lenses, or non-corrective lenses for users with normal vision. The telescope lenses 40 and 42 of the present invention work equally as well in either application.

Figure 6:
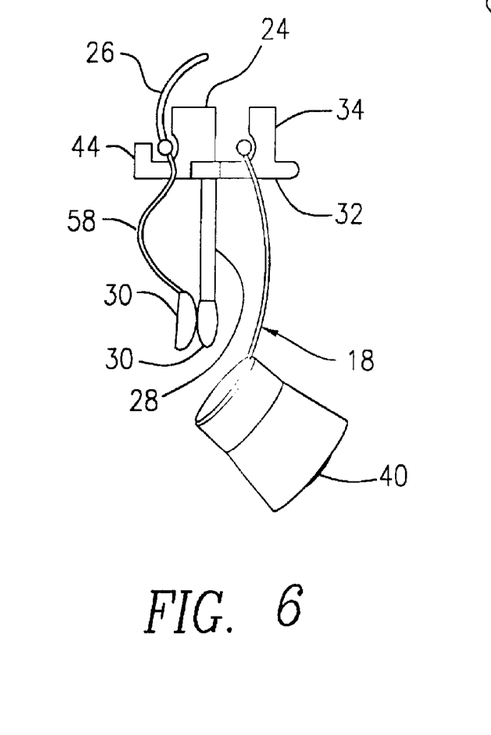
FIG. 6 is a side view illustrating the optical device and lens assembly.

Referring to FIGS. 5 and 6, the U-shaped configuration of the telescope support bracket 18 is also contoured to follow the shape of the spectacle frame and to allow for the placement of the telescopes 40 and 42 at an angle of approximately 45° to the surface of the optical lenses 14 and 16 of the eyeglass frame 12 when the optical device 10 is in the operative position.

To attach the optical device 10 to a spectacle frame 12, the handle 56 is squeezed to separate the pairs of clamping arms 28 and 58, and the device 10 is placed onto the frame 12. Preferably, the device 10 is centered onto the frame 12. To flip the lens assembly from the operative position to the non-operative position, the user grasps the telescope mounting bracket 18 or one of the lenses 40 or 42, and flip up until the lens assembly "clicks" into the non-operative position. To return the lens assembly to the operative position, the user grasps the telescope mounting bracket 18 or one of the lenses 40 or 42 and flips the lens assembly down until it "clicks" into the operative position. When necessary, the lenses 40 and 42 may be realigned as indicated by the arrow in FIG. 7a. Only one circular field of vision should be seen through the lenses when in proper alignment.

The construction of the device 10 enables the user to easily and repeatedly flip up the lens assembly in a non-operative position to an operative position with the use of only one hand, and does not interfere with the user's normal vision when the lens assembly is in the operative position.

Numerous modifications are intended to be included within the scope of the invention as defined in the appended claims without departing from the spirit and scope of the invention. It is intended that the invention shall cover by suitable expression in the appended claims whatever features of patentable novelty exist in the invention disclosed.

What is claimed is:

1. A telescope lens assembly removably mountable on a spectacle frame, comprising:

a mounting bracket comprising a base and a first pair of fixed clamping arms;

a support bracket including a pivot member that pivotally mounts the support bracket to the mounting bracket, the pivot member having a projection that defines an extended flat surface and a V-shape surface;

a telescope lens mounted on said support bracket, the support bracket pivoting the telescope lens between and operative position and a non-operative position;

a spring clipcomprising a handle, a second pair of clamping arms for engaging with said first pair of clamping arms, and two projections;

a wire spring wound around each of said two projections, said spring having a portion that engages said extended flat surface when said telescope lens is in said operative position and that engages said V-shape surface when said telescope lens is in said non-operative position.

2. The assembly of claim 1, wherein said mounting bracket is composed of plastic.

3. The assembly of claim 2, wherein said spring clip is composed of metal.

4. The assembly of claim 3, wherein said telescope lens are Galilean.

5. The assembly of claim 4, disposed on a spectacle frame.

6. A telescope lens assembly removably mountable on a spectacle frame, comprising:

an elongate bar member comprising a substantially planar surface with raised portions each portion defining an interior;

a first pair of fixed clamping arms disposed substantially perpendicular to said bar member;

a first platform comprising a substantially planar surface extending in a first direction from said bar member, and a stop which defines a recess, said stop disposed substantially perpendicular to said first platform;

two second platforms extending in a second direction from said bar member, each of said two second platforms comprising a brace disposed substantially perpendicular to said bar member;

a telescope lens assembly comprising telescope lens and a support bracket including a pivot member that pivotally mounts the support bracket to said first platform adjacent said recess, the pivot member having a projection that defines an extended flat surface and a V-shape surface, the support bracket pivoting the telescope lens between and operative position and a non-operative position;

a clip member pivotally mounted by a double spirally wound spring adjacent said brace of each of said two second platforms and said interior of said raised portions, said clip member comprising a first post and second post for receiving the respective spirally wound portions of said spring, and a second pair of fixed clamping arms for cooperatively engaging with said first pair of fixed clamping arms, said spring member having a portion that engages said extended flat surface when said telescope lens is in said operative position and that engages said V-shape surface when said telescope lens is in said non-operative position.

7. The assembly of claim 6, wherein said clip member further includes a handle.

8. The assembly of claim 7, wherein said elongate bar member, said first pair of clamping arms, said first platform, and said two second platforms are of unitary construction.

9. The assembly of claim 8, wherein said telescope lens assembly further comprises Galilean telescope lenses.

10. The assembly of claim 8, wherein said unitary construction is composed of plastic.

11. The assembly of claim 8, wherein said support bracket is composed of metal.

12. The assembly of claim 11, wherein said clip member is composed of metal.

13. A telescope lens assembly removably mountable on a spectacle frame, comprising:

a mounting bracket, comprising:

a planar base with raised portions extending in one direction having semi-circular cutaway interiors;

a first pair of fixed clamping arms extending substantially perpendicular to and extending in an opposite direction from said raised portions;

a first platform comprising a planar surface extending in a first direction from said base along the same plane thereof, and a stop which defines a recess, said stop disposed substantially perpendicular to said first platform; and two braces extending in a second direction from said base, each of said braces disposed substantially perpendicular to said base, a telescope lens assembly comprising a telescope lens and a support bracket including a pivot member that pivotally mounts said support bracket to said first platform adjacent said recess, the pivot member having a projection that defines an extended flat surface and a V-shape surface, the support bracket pivoting the telescope lens between and operative position and a non-operative position; and a clip member comprising: a handle, a first post and a second post, and a second pair of fixed clamping arms for cooperatively engaging with said first pair of fixed clamping arms, wherein a spring member is spirally wound onto said first post and said second post for pivotally mounting said clip member to said mounting bracket, and said spring member having a portion that engages said extended flat surface when said telescope lens is in said operative position and that engages said V-shape surface when said telescope lens is in said non-operative position.

14. The assembly of claim 13, disposed on a spectacle frame.

* * * * *